May 2, 1933.  O. R. STEPHEN  1,907,410
MACHINE FOR MOLDING GLASS PIECES
Filed March 26, 1930  5 Sheets-Sheet 1
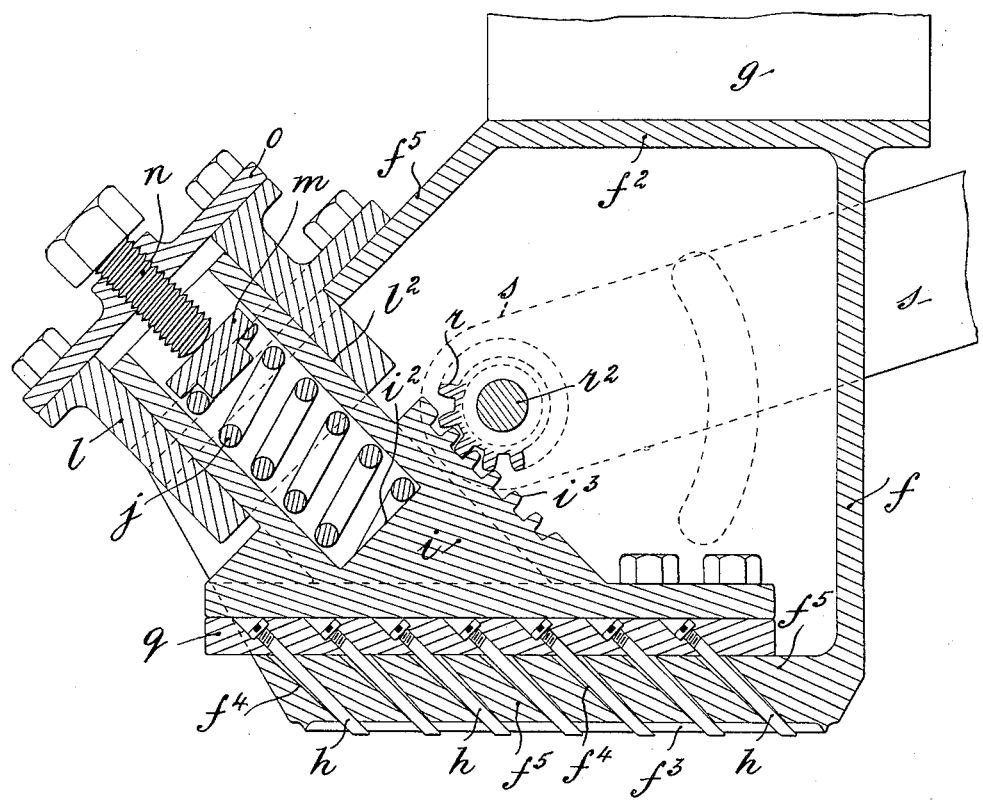
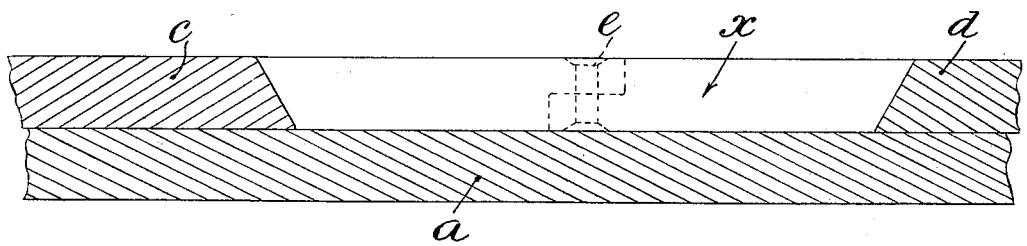
INVENTOR
Oscar R. Stephen,
BY
ATTORNEY

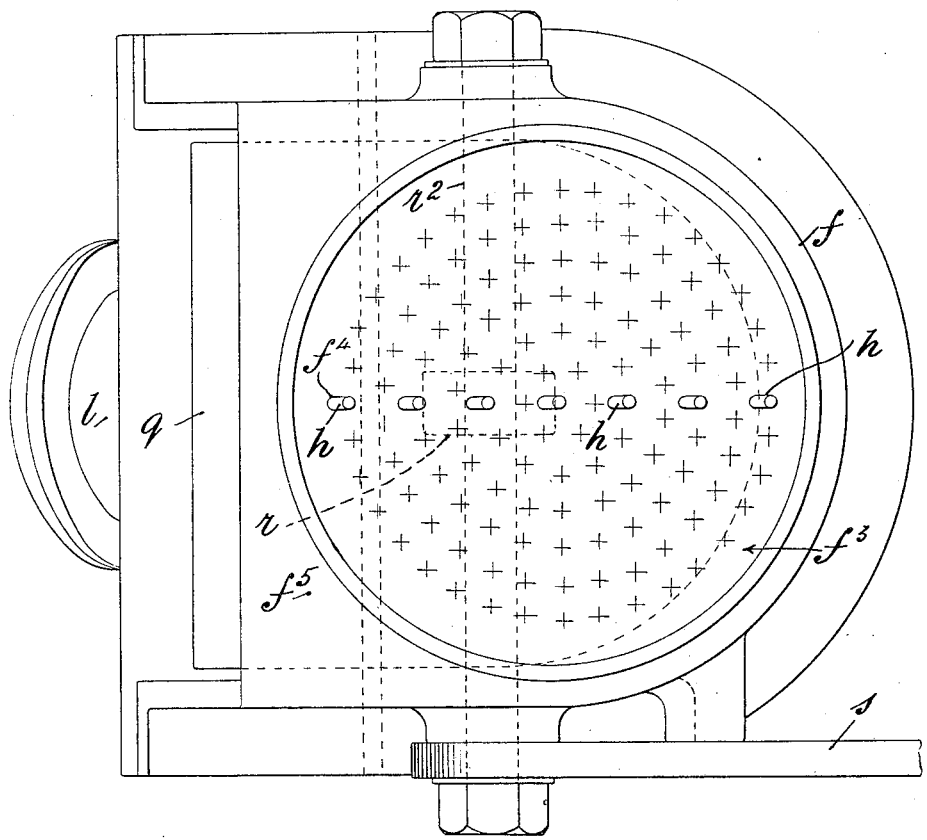

May 2, 1933.   O. R. STEPHEN   1,907,410
MACHINE FOR MOLDING GLASS PIECES
Filed March 26, 1930   5 Sheets-Sheet 3
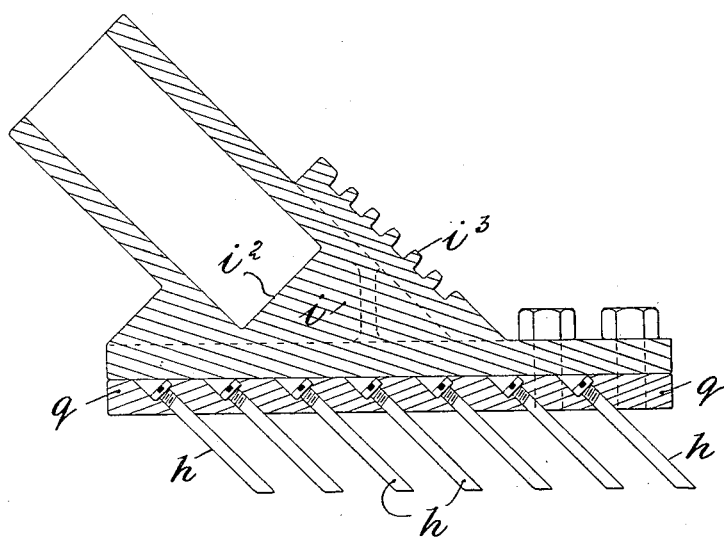
Fig. 3.
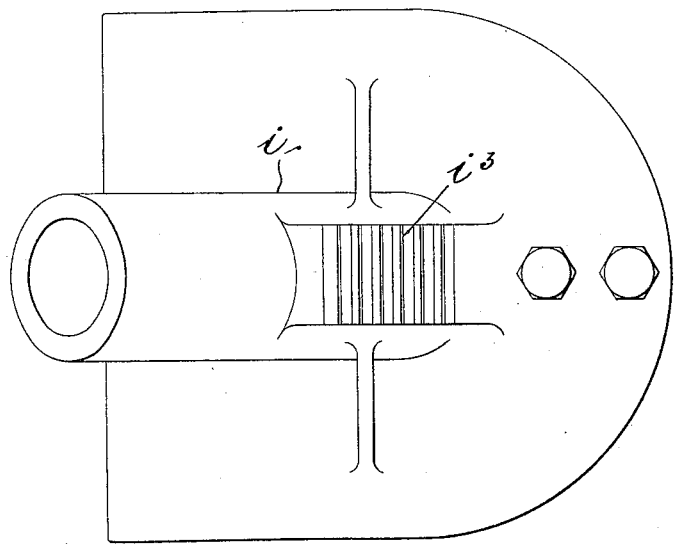
Fig. 4.
INVENTOR
Oscar R. Stephen,
BY 
ATTORNEY

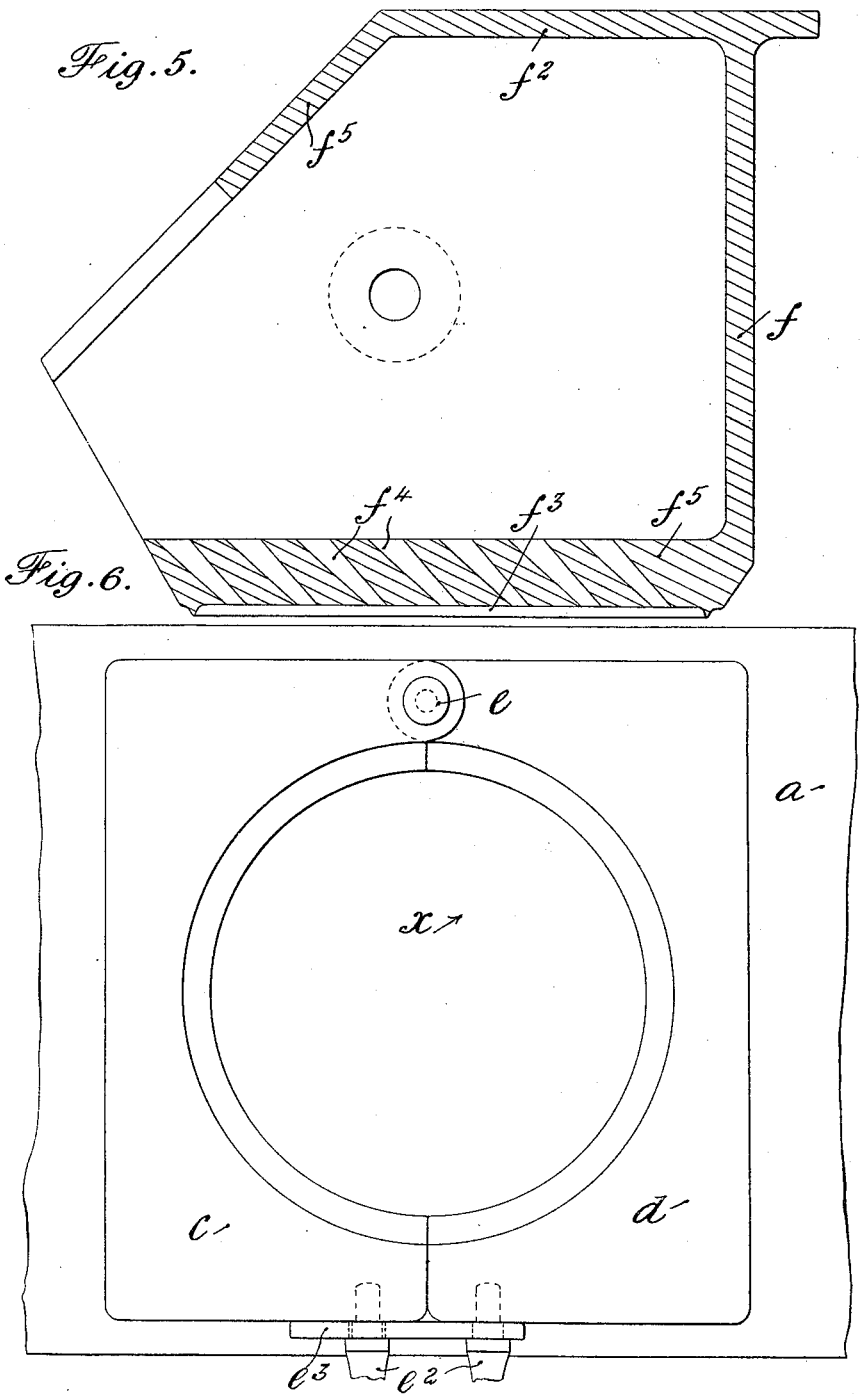

May 2, 1933.     O. R. STEPHEN     1,907,410
MACHINE FOR MOLDING GLASS PIECES
Filed March 26, 1930     5 Sheets-Sheet 5
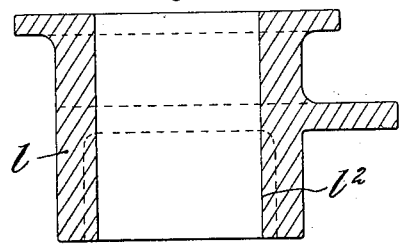
Fig. 8.
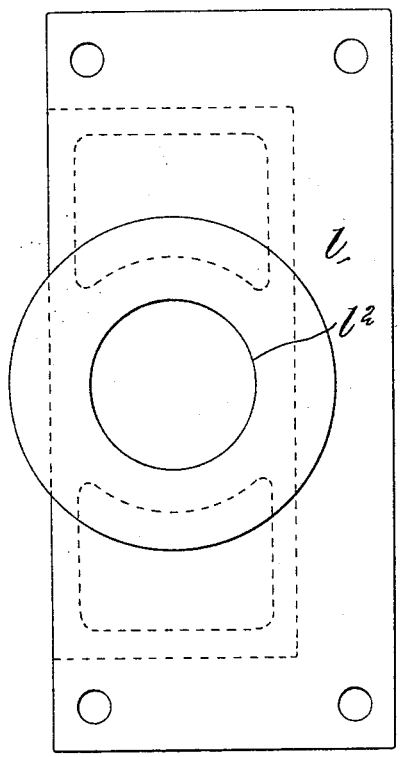
Fig. 7.
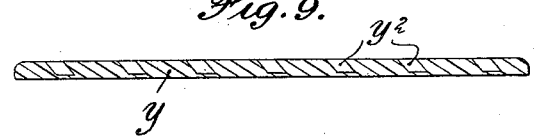
Fig. 9.
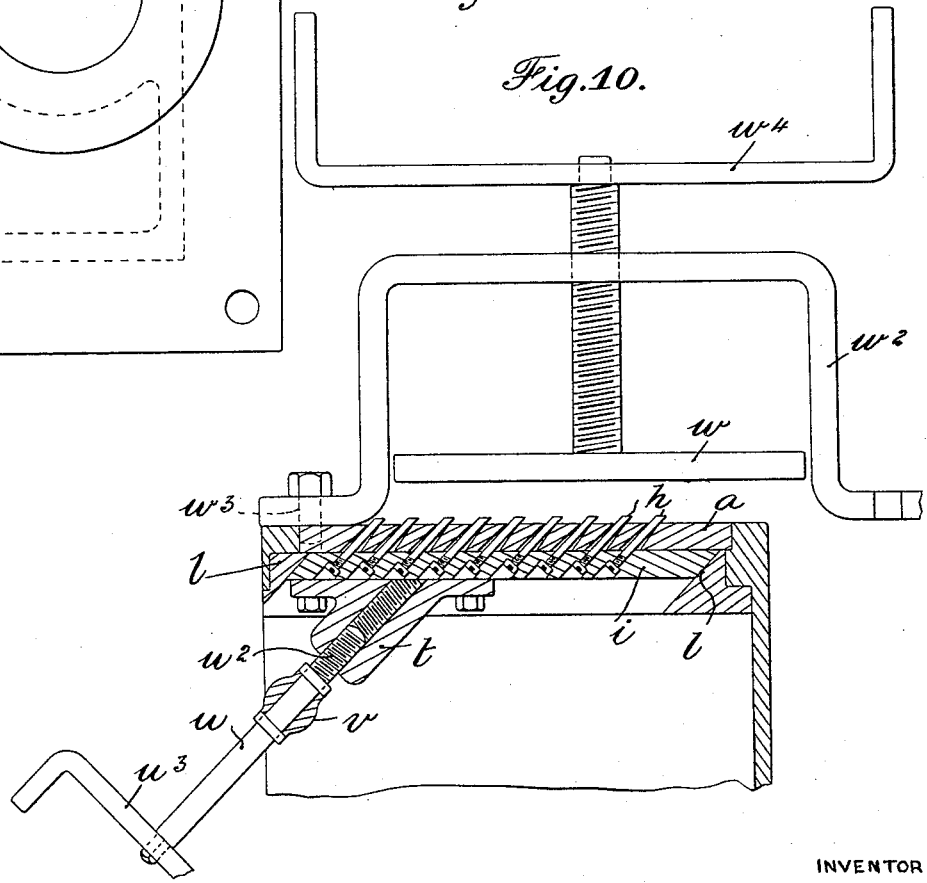
Fig. 10.
INVENTOR
Oscar R. Stephen,
BY 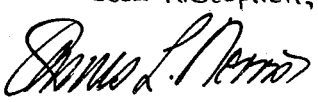
ATTORNEY Patented May 2, 1933

1,907,410

UNITED STATES PATENT OFFICE

OSCAR REGINALD STEPHEN, OF BRIERLY HILL, ENGLAND

MACHINE FOR MOLDING GLASS PIECES

Application filed March 26, 1930, Serial No. 439,069, and in Great Britain March 28, 1929.

The invention provides a machine for molding flat glass pieces having a plurality of obliquely directed sockets or holes through its thickness. The machine has a novel core comprising a plurality of obliquely directed rigid pegs whose ends are used to form the sockets or holes and all of which are simultaneously withdrawn from the molding cavity by a movement of the whole core parallel with the obliquity of the pegs after molding pressure has been applied and before the molding cavity is opened for the removal of the molded sheet or article.

The constructional features of the machine in its desirable form are as follows. The socket or hole forming pegs are carried by a pressure block arranged above a molding space provided by the table, said pressure block being adapted to be applied to the lower end of the plunger of the press to descend and rise with the plunger, the pegs being fixed to an obliquely slidable member operated from a lever in combination with a spring to project and withdraw the pegs in relation to the underside of the pressure block which forms the upper surface of the molding cavity. In another example the socket forming pegs are applied to the table which forms the bottom of the mold and above the table a pressure plate operates to press the molten glass against the table and around the pegs.

The machine is mainly designed for the production of a glass piece to be used as a lens of a motor-vehicle lamp, the sockets or holes being directed downwardly to cause objectionable dazzling light rays to pass downwardly instead of forwardly or upwardly or sideways.

Two examples of machines and a glass piece suitable as a lens are represented in the accompanying sheets of drawings.

Fig. 1 is a vertical section through the mold and pressure block.

Fig. 2 is an underside plan of the pressure block and the parts it carries.

Fig. 3 is a vertical section of the slidable member separately.

Fig. 4 is a plan of Fig. 3.

Fig. 5 is a vertical section of the pressure block separately.

Fig. 6 is a plan of the table and the side members of the molding cavity.

Fig. 7 is a plan of a sleeve-like housing for the slidable member.

Fig. 8 is a vertical section of Fig. 7.

Fig. 9 is a section of the glass piece.

Fig. 10 is a vertical section of another form of machine.

Figs. 1 to 8 represent one example of machine constructed in accordance with the invention, Fig. 9 the lens product, and Fig. 10 the other example of machine.

With specific reference to Figs. 1 to 8, a flat horizontal table $a$ forms the bottom of the mold cavity, $x$, of which the sides are formed by horizontal plate-like segments, $c$, and, $d$, hinged to each other and to the table at $e$ and provided with handles $e2$, to open and close said segments, and with a hinged catch $e3$ to hold said segments closed. The molding cavity is larger than the actual size of the lens $y$, Fig. 9, to be produced, and is formed by the table $a$, the segments $c$ and $d$ and the underside of a pressure block to be hereinafter described, and when the article is removed the surplus glass from the boundary is severed. The pressure block comprises a rigid hollow casting $f$ adapted to be secured at its upper end $f2$ to the lower end $g$ of the plunger of a hand or power press and to descend and rise vertically with the plunger, the underside $f3$ of this block being of such shape and size as to form a complementary part of the cavity $x$ of the mold and to leave a continuous space between it and the bottom and side segments for shaping the flat glass sheet $y$, Fig. 9, when the mold is closed. Numerous pegs, $h$, to form the corresponding sockets $y2$ in the glass sheet $y$, extend through holes $f4$ in the bottom wall $f5$ of the pressure block $f$, and are rigidly carried at their upper ends by a slidable body member $i$, the lower end of said pegs normally projecting from the underface of the pressure block, as shown, by the pressure of the coiled spring $j$ operating in compression. The slidable member $i$ is efficiently mounted and guided at $i2$ within a sleeve-like housing $l$ detachably and rigidly applied to an oblique wall $f5$ of the pressure block, said member being substantially contained within the hollow interior of said pressure block. The angle of the axis of the sleeve relatively to the bottom wall $f5$ of the pressure block is the same as the obliquely directed socket-forming pegs $h$, so that the sliding movement of the member $i$ is at the same angle as the obliquity of the pegs. The spring $j$ bears at one end against the bottom $i2$ of a bore of the slidable member, and at its other end against a bearer block $m$ which is held against the spring end by an adjustable screw-pin $n$ carried by a cap $o$ rigidly but detachably applied to the upper end of the housing, $l$, so that the pressure of the spring may be adjusted. The pegs $h$ are detachably secured to an under-plate $q$ rigidly secured to the under-surface of the slidable member $i$.

Rack teeth $i3$ are provided upon the slidable member in mesh with the teeth of a pinion $r$ mounted fast upon a shaft $r2$ extending horizontally through the pressure block and finding suitable bearings therein. A lever $s$ is fitted to the end of the shaft outside of the pressure block for hand actuation to rock the shaft and to move the slidable member $i$ in the reverse direction to the action of the spring $j$, this movement drawing pegs $h$ into the bottom wall $f5$ of the pressure block $f$ against the counter pressure of the spring $j$.

It will be understood that the pegs $h$ are numerous, that is to say, any number dependent upon the article to be produced, a few only being shown in Fig. 2, whereas at the center of each of the small crossed lines, Fig. 2, a similar peg is provided, all rigidly carried by the plate $q$ which normally abuts against the upper surface of the bottom wall $f5$ of the pressure block under the action of the spring $j$.

The operation of the machine is as follows: The required amount of liquid glass is introduced into the molding space $x$ formed by the table $a$ and the side segments $c$ and $d$, the latter being previously closed, and then, with the pressure block retracted as in Figure 1 the plunger of the press is moved downwardly to force the lower face of the pressure block against the liquid glass and the lower ends of the pegs $h$ are caused to penetrate into said liquid glass and mold the plate and the sockets therein, the descent of the pressure block pressing the sheet into the size, shape and thickness required, namely, the lens, Fig. 9. The pressure exerted by the plunger is instantly sufficient, and while it is maintained and while the mold is closed, the lever $s$ is hand-operated to withdraw the pegs from the holes or sockets $y2$ which they have shaped in the glass sheet $y$, after which, and while the pegs are still withdrawn, the plunger $g$ is bodily lifted to lift the pressure block $f$ clear of the molding space which can then be fully opened and the molded glass sheet removed. The operation can then be repeated, a resultant article being the lens represented by Fig. 9, with oblique sockets formed therein and with one face of the lens imperforate.

In Fig. 10, the same letters of reference are used where possible to indicate corresponding parts.

The oblique pegs $h$ extend through apertures in a table $a$, and are carried by the slidable member, $i$, efficiently guided in an oblique housing $l$, but said slidable member is positively operated by screw action to project and withdraw the pegs, the slidable member having a screwed sleeve $t$ secured to its under side with which sleeve the one end $u2$ of a traversing screw $u$ engages, said screw having bearings in a lug $v$ fixed to the under frame of the machine and being revolved by the handle $u3$. A screw-operated pressure plate $w$ is disposed above the table $a$ and the screw is carried by a yoke $w2$ which can swing aside on the bolt $w3$ by which it is secured to the bed, carrying the pressure plate $w$ with it to permit the removal of the molded plate.

In this form of the invention the pegs $h$ are first projected above the upper surface of the table, the pressure plate $w$ being swung aside, and then the molten glass is placed on the table, and is rolled by a suitable roller over the pegs, after which the pressure plate $w$ is caused by rotation of the handle $w4$ to press the molten glass to the desired thickness and to closely surround the pegs, after which the pegs are first quickly withdrawn by unscrewing the screw $w2$ and then the pressure on the pressure plate $w$ is relieved and the pressure plate $w$ is swung aside so that the molded plate can be removed from the table $a$. If holes through the plate instead of sockets are required the bottoms of the sockets may be removed, or the pegs $h$ be arranged to project so as to mold holes.

Having now described my invention, what I claim and desire to secure by Letters Patent is—

1. A machine of the class described comprising a table, means thereon providing a cavity and operable for opening and closing the cavity, a pressure block movable toward and away from the cavity to cooperate therewith, a sleeve member on the pressure block, an obliquely movable core guided by said sleeve member toward and away from the pressure block embodying a number of obliquely disposed pegs, a spring device to normally urge said die toward and said pegs into the cavity, and lever and rack means between the pressure block and die for moving the die in the opposite direction and withdrawing the pegs.

2. A machine of the class described comprising a table adapted to receive material for molding, a hollow pressure block movable toward and away from the zone of molding provided with a wall having oblique openings, a die member within the block normally resting on said wall having pegs disposed in said openings and of a length to project beyond the wall, a cylinder member with which the die is slidably interfitted disposed at the angle of said pegs and arranged above said wall, spring means urging the die into engagement with said wall, and means on the pressure block operable to move the die independently of movement of the pressure block.

In testimony whereof I have affixed my signature.

OSCAR REGINALD STEPHEN.